United States Patent
Fan et al.

(10) Patent No.: US 7,656,655 B2
(45) Date of Patent: Feb. 2, 2010

(54) MOUNTING APPARATUS FOR A DATA STORAGE DEVICE WITH DAMPING MEMBER

(75) Inventors: Chen-Lu Fan, Tu-Cheng (TW); Chieh Yang, Tu-Cheng (TW); Li-Ping Chen, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 303 days.

(21) Appl. No.: 11/309,240

(22) Filed: Jul. 18, 2006

(65) Prior Publication Data

US 2008/0019091 A1    Jan. 24, 2008

(51) Int. Cl.
H05K 5/00        (2006.01)
H05K 7/00        (2006.01)

(52) U.S. Cl. ............ 361/679.34; 361/679.33; 361/679.37; 361/679.38; 361/679.39

(58) Field of Classification Search .......... 361/683, 361/685, 679.34, 679.36, 679.33, 679.37, 361/679.38, 679.39
See application file for complete search history.

(56) References Cited

U.S. PATENT DOCUMENTS

| | | | | | |
|---|---|---|---|---|---|
| 4,232,921 | A | * | 11/1980 | Peele | 312/350 |
| 4,683,520 | A | * | 7/1987 | Grassens et al. | 361/825 |
| 4,713,714 | A | * | 12/1987 | Gatti et al. | 360/137 |
| 5,041,924 | A | * | 8/1991 | Blackborow et al. | 360/69 |
| 5,584,396 | A | * | 12/1996 | Schmitt | 211/26 |
| 5,627,727 | A | * | 5/1997 | Aguilera et al. | 361/686 |
| 5,710,728 | A | * | 1/1998 | Danielson et al. | 713/321 |
| 5,730,515 | A | * | 3/1998 | Ho | 312/350 |
| 5,751,551 | A | * | 5/1998 | Hileman et al. | 361/753 |
| 6,075,694 | A | * | 6/2000 | Mills et al. | 361/685 |
| 6,102,500 | A | * | 8/2000 | Chen | 312/223.2 |
| 6,320,744 | B1 | * | 11/2001 | Sullivan et al. | 361/685 |
| 6,442,031 | B1 | * | 8/2002 | Liu | 361/727 |
| 6,487,071 | B1 | * | 11/2002 | Tata et al. | 361/679.34 |
| 6,619,766 | B1 | * | 9/2003 | Mansueto | 312/223.1 |
| 6,781,843 | B2 | * | 8/2004 | Liu et al. | 361/726 |
| 6,809,916 | B2 | * | 10/2004 | Nakata et al. | 361/115 |
| 6,980,430 | B2 | * | 12/2005 | Su | 361/685 |
| 7,312,999 | B1 | * | 12/2007 | Miyamura et al. | 361/724 |
| 7,394,660 | B2 | * | 7/2008 | Hidaka | 361/727 |
| 2005/0088778 | A1 | * | 4/2005 | Chen et al. | 360/97.02 |
| 2007/0127204 | A1 | * | 6/2007 | Muenzer et al. | 361/685 |
| 2007/0195496 | A1 | * | 8/2007 | Wu et al. | 361/683 |

* cited by examiner

Primary Examiner—Jayprakash N Gandhi
Assistant Examiner—Anthony M Haughton
(74) Attorney, Agent, or Firm—Wei Te Chung

(57) ABSTRACT

A mounting apparatus includes a first cage (10) and a second cage (20). The first cage includes a plurality of damping members (30). Each of the damping members has a rotatable portion (32). The rotatable portions are rotatable relative to the first cage about rotational axes thereof. The second cage is capable of sliding into the first cage in a sliding direction, and contacting with the rotatable portions of the damping members. The rotational axes of the rotatable portions of the damping members are generally perpendicular to the sliding direction of the second cage.

10 Claims, 5 Drawing Sheets

MOUNTING APPARATUS FOR A DATA STORAGE DEVICE WITH DAMPING MEMBER

FIELD OF THE INVENTION

The present invention relates to mounting apparatuses, and more particularly to a mounting apparatus for a data storage device with a damping member.

DESCRIPTION OF RELATED ART

In a conventional server or computer system, a plurality of data storage devices is usually provided. When the data storage devices are at work, vibration is generated and may damage the data storage devices. In order to reduce the damage to the data storage devices, damping members are often provided.

For example, a bracket of a computer enclosure is used to receive the data storage devices, and includes a bottom wall, a first side wall, and a second side wall. The first side wall and the second side wall are perpendicular to the bottom wall. The second side wall is capable of resiliently deforming. A plurality of damping gaskets is disposed between the data storage devices and the walls, thereby absorbing the vibration generated in the data storage devices and reducing the risk of damage. Although the damping members absorb vibration, friction between the damping gaskets and the data storage device is so large that difficulties are caused when trying to slide the data storage devices into the bracket during installation.

What is needed, therefore, is a mounting apparatus providing damping members which allow convenient installation of data storage devices.

SUMMARY OF THE INVENTION

A mounting apparatus includes a first cage and a second cage. The first cage includes a plurality of damping members. Each of the damping members has a rotatable portion. The rotatable portions are rotatable relative to the first cage about rotational axes thereof. The second cage is capable of sliding into the first cage in a sliding direction, and contacting with the rotatable portions of the damping members. The rotational axes of the rotatable portions of the damping members are generally perpendicular to the sliding direction of the second cage.

Other advantages and novel features will be drawn from the following detailed description of preferred embodiments with attached drawings, in which:

DETAILED DESCRIPTION OF THE INVENTION

Figure 1:
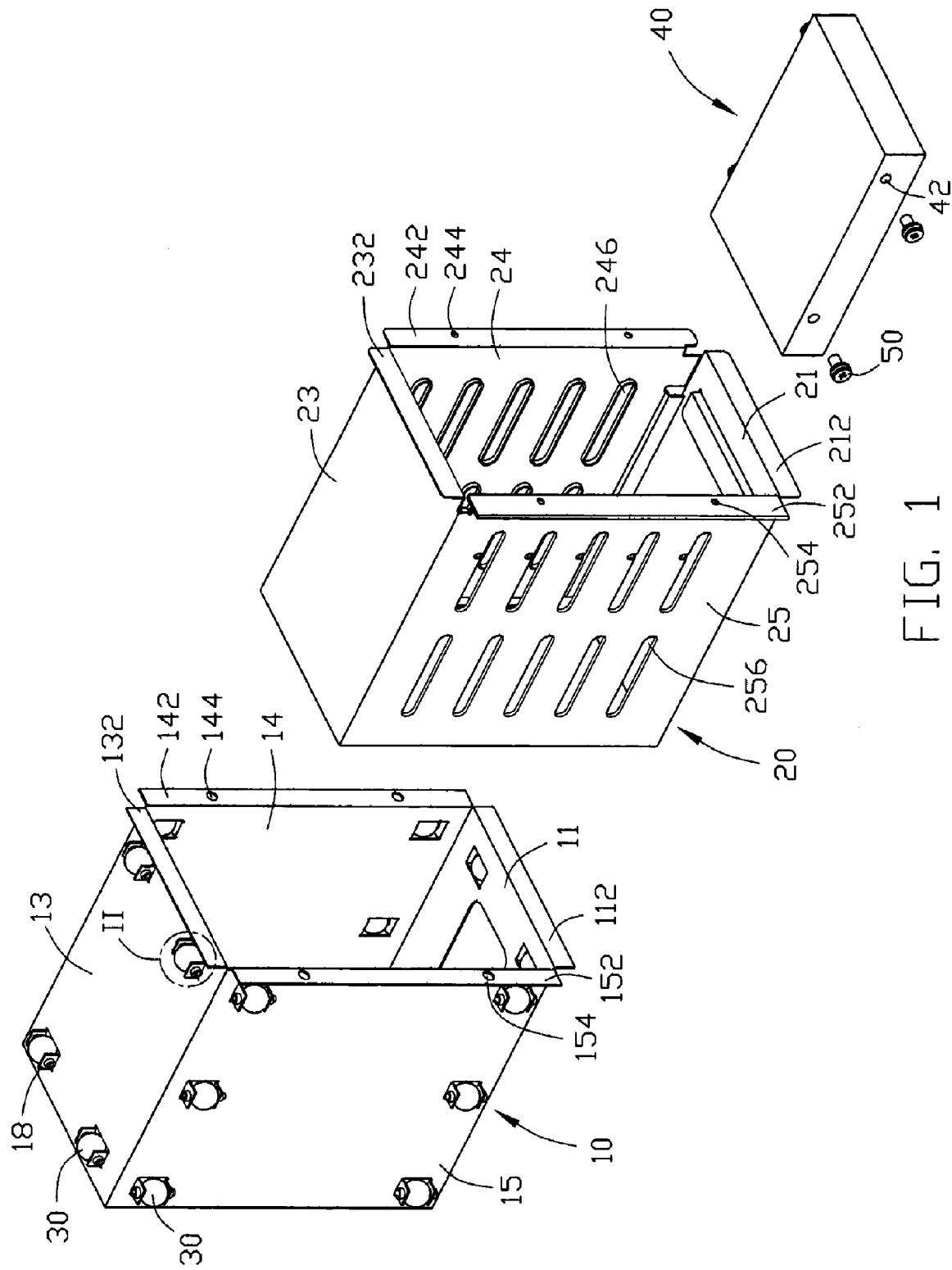
FIG. 1 is an exploded, isometric view of a mounting apparatus of a preferred embodiment of the present invention, together with a data storage device, the mounting apparatus including a first cage, a plurality of damping members, and a second cage.

Referring to FIG. 1, a mounting apparatus is configured for securing a data storage device 40 therein. The data storage device 40 defines a plurality of securing holes 42 in opposite side walls thereof. The mounting apparatus includes a first cage 10, a plurality of damping members 30, and a second cage 20.

Figure 2:
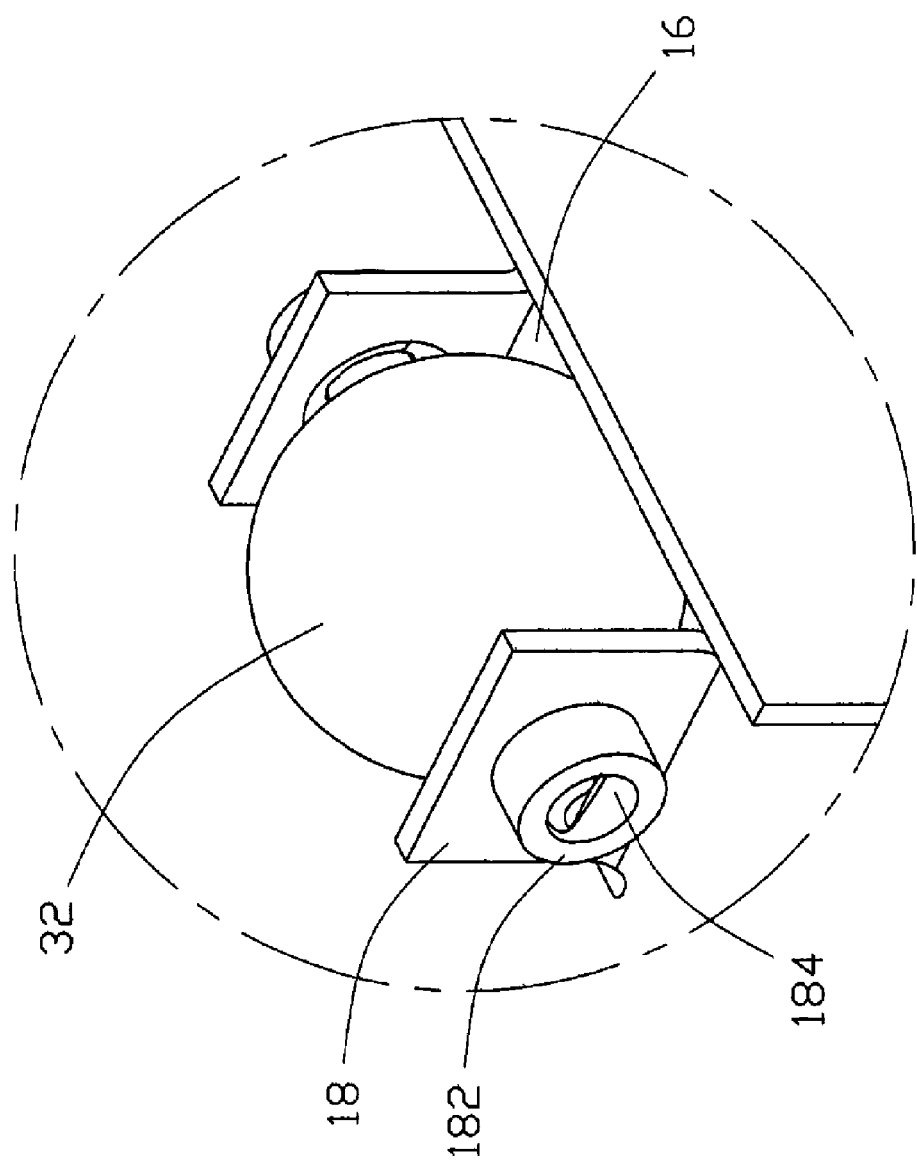
FIG. 2 is an enlarged view of circled portion II of FIG. 1.

The first cage 10 includes a bottom plate 11, a top plate 13, and two parallel side plates 14, 15. The bottom plate 11 is parallel to the top plate 13, and perpendicular to the side plates 14, 15. Mounting flanges 112, 132, 142, 152 are perpendicularly bent out from front edges of the plates 11, 13, 14, 15 respectively. The first cage 10 defines an entrance (not labeled) formed at a front end thereof and surrounded by the mounting flanges 112, 132, 142, 152. Two mounting holes 144, 154 are respectively defined in the mounting flanges 142, 152. Referring also to FIG. 2, a plurality of openings 16 is defined in each of the plates 11, 13, 14, 15. Two parallel securing pieces 18 are perpendicularly bent up from opposite edges of each opening 16 parallel to conjunctive edges between the top plate 13 and the side plates 14, 15, or the bottom plate 11 and the side plates 14, 15. A support portion 182 is formed on an outer surface of each securing piece 18. A locking hole 184 is defined in each support portion 182 and extends through the corresponding securing piece 18.

Figure 3:
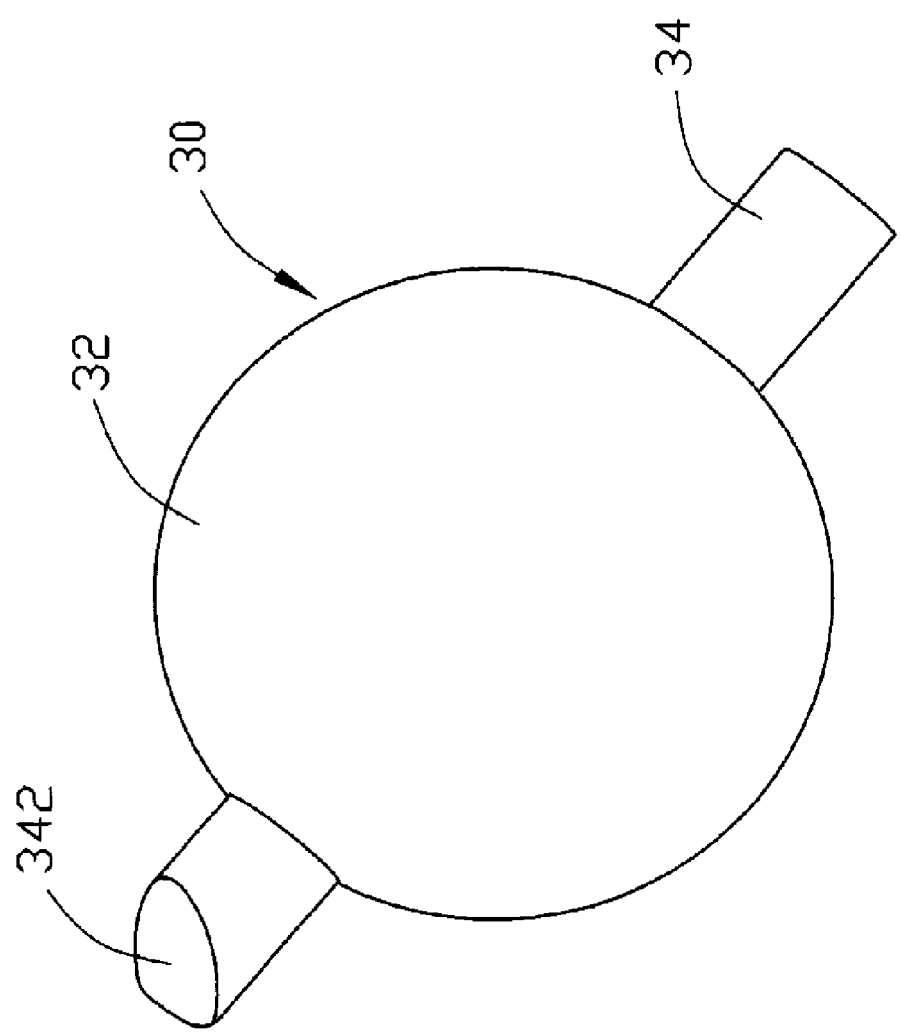
FIG. 3 is an isometric view of the damping member of FIG. 1.

Referring to FIG. 3, each of the damping members 30 is made of vibration absorbing material and includes a rotatable portion, such as a spherical portion 32, and a shaft 34. A diameter of each spherical 32 is not more than a distance between the opposite securing pieces 18 of each opening 16. A through hole (not shown) is defined in the spherical portion 32 along a radial direction. The shaft 34 is capable of being inserted into and extending through the through hole of the spherical portion 32. A slanted surface 342 is formed at an end of the shaft 34 for conveniently installing the shaft 34 into the through hole of the spherical portion 32 and the locking holes 184 of the securing pieces 18.

Referring to FIG. 1, the second cage 20 includes a bottom wall 21, a top wall 23, and two parallel side walls 24, 25. The bottom wall 21 is parallel to the top wall 23, and perpendicular to the side walls 24, 25. Positioning flanges 212, 232, 242, 252 are perpendicularly bent out from front edges of the walls 21, 23, 24, 25. Two positioning holes 244, 254 are respectively defined in the positioning flanges 242, 252. A plurality of locating slots 246, 256 is defined in the side walls 24, 25.

Figure 4:
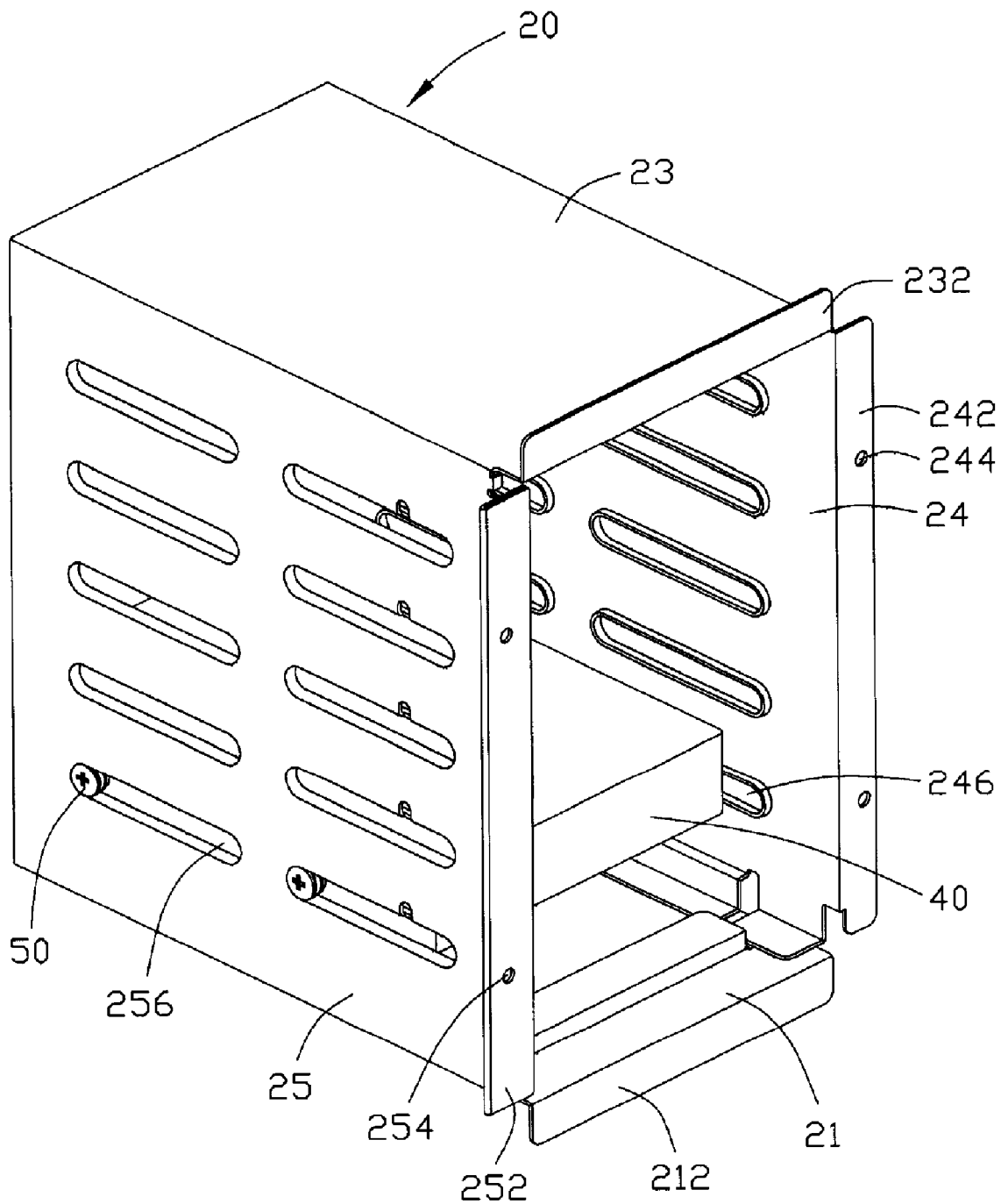
FIG. 4 is an assembled view of the second cage and the data storage device.
Figure 5:
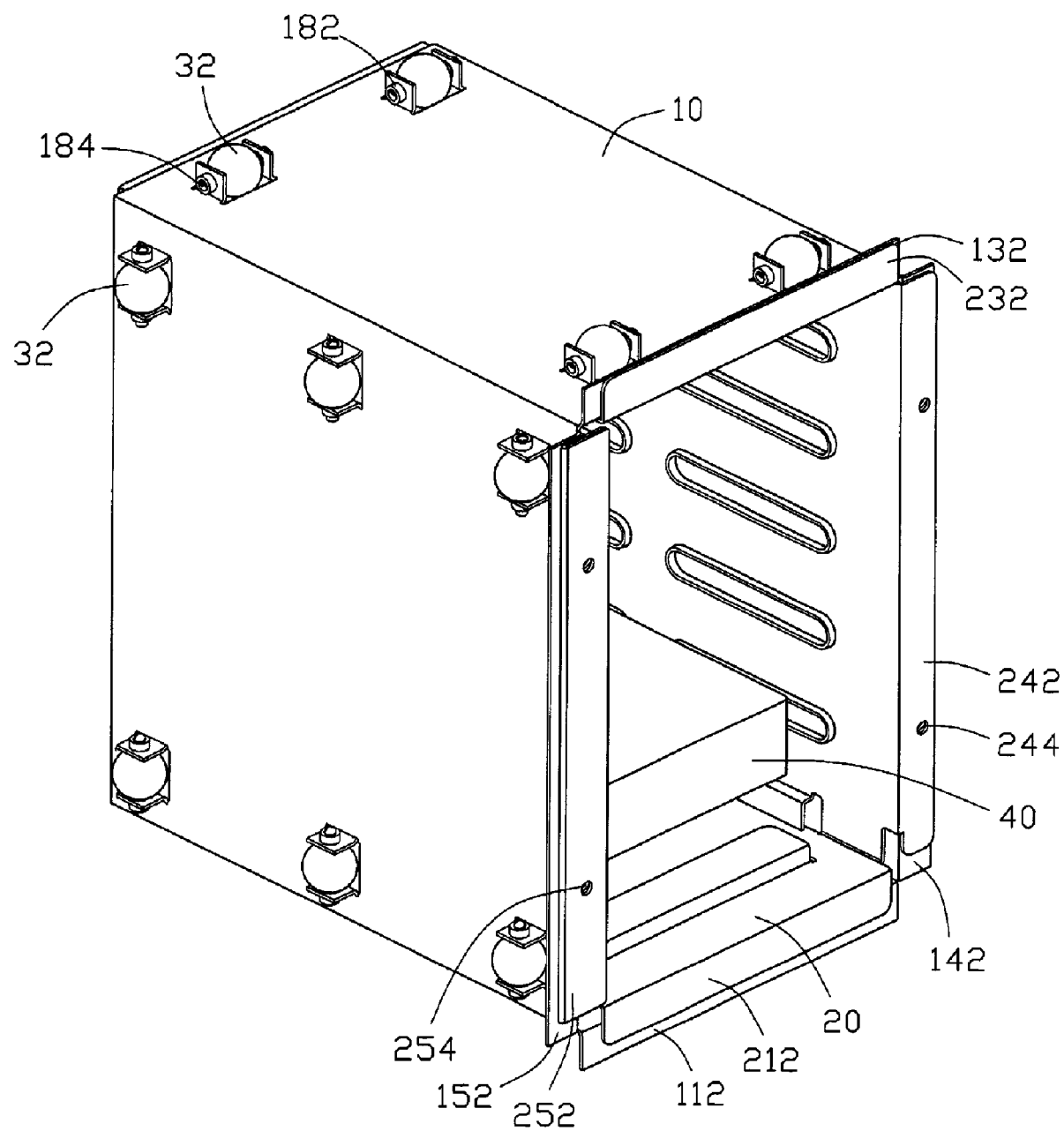
FIG. 5 is an assembled view of FIG. 1.

Referring also to FIGS. 4 and 5, before assembling the data storage device 40, the spherical portions 32 of the damping members 30 are placed between the securing pieces 18 of each opening 16. The through holes of the spherical portions 32 align with the locking holes 184 of the securing pieces 18. The shafts 34 of the damping members 30 are inserted into the through holes and the locking holes 184. The damping members 30 are thus installed on the first cage 10. The shafts 34 on the plates 11, 13, 14, 15 are respectively parallel to the front edges of the plates 11, 13, 14, 15. The spherical portions 32 extend into the first cage 10 through the openings 16.

The data storage device 40 is pushed into the second cage 20. A plurality of fasteners, such as screws 50, is inserted through the locating slots 246, 256, and extends into the securing holes 42 of the data storage device 40. The data storage device 40 is thereby secured into the second cage 20. The second cage 20 together with the data storage device 40 is then pushed into the first cage 10 via the entrance thereof, along a direction generally perpendicular to the shafts 34 of the damping members 30. The walls 21, 23, 24, 25 of the second cage 20 touch the spherical portions 32 of the damping members 30, and drive the spherical portions 32 to rotate about the shafts 34. The positioning flanges 212, 232, 242, 252 of the second cage 20 abut on the mounting flanges 112, 132, 142, 152 of the first cage 10. The positioning holes 244, 254 of the positioning flanges 242, 252 align with the mounting holes 144, 154 of the mounting flanges 14, 15. A plurality of fasteners (not shown), such as screws, is screwed into the positioning holes 244, 254 and the mounting holes 144, 154. The second cage 20 is thus installed into the first cage 10.

In use, vibrations generated by the data storage device 40 are dampened and cannot be transferred to the second cage 20 since the second cage 20 contacts with the spherical portions 32 of the damping members 30 of the first cage 10.

In addition, the second cage 20 is easily slid into the first cage 10, due to the rotating action of the spherical portions 32. Thus, installation of the second cage 20 together with the data storage device 40 into the first cage 10 is convenient.

Furthermore, the spherical portions 32 of the damping members 30 may be replaced by other rotatable portions such as cones, or cylinders.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for data storage devices, comprising:
   a first cage defining a plurality of openings therein;
   a plurality of damping members being rotatably disposed outside the first cage, the damping members extending into the first cage via the openings; and
   a second cage for receiving the data storage devices, the second cage accommodated in the first cage and abutting against the damping member, wherein the second cage pushes the damping members to rotate while being inserted into the first cage, wherein two parallel securing pieces are formed perpendicular to the first cage at opposite edges of each of the openings, and each of the damping members is rotatably disposed between the securing pieces of each openings.

2. The mounting apparatus as described in claim 1, wherein each of the damping members comprises a rotatable portion and a shaft inserting into the rotatable portion, and the damping members are capable of being rotated about the shafts.

3. The mounting apparatus as described in claim 2, wherein the securing pieces are disposed outside of the first cage, each of the securing pieces defines a locking hole therein for receiving a corresponding one of the shafts.

4. The mounting apparatus as described in claim 2, wherein the first cage comprises a bottom plate, a top plate, and two parallel side plates, the bottom plate is parallel to the top plate and perpendicular to the side plates, the shafts are parallel to conjunctive sides of the top plate and the side plates, and conjunctive edges of the bottom plate and the side plates.

5. The mounting apparatus as described in claim 1, wherein a mounting flange is formed on the first cage which defines a mounting hole therein, and a positioning flange is formed on the second cage which defines a positioning hole therein, corresponding to the mounting hole.

6. The mounting apparatus as described in claim 1, wherein the rotatable portions are generally spherical.

7. A mounting apparatus for data storage devices, comprising:
   a first cage;
   a second cage configured for receiving the data storage devices in a first direction, the second cage being accommodated in the first cage in a second direction parallel to the first direction; and
   a plurality of damping members each having at least one portion disposed between the first cage and the second cage and being rotatable about axes of the at least one portion relative to the first cage and the second cage while the second cage entering into the first cage, the axes of the at least one portion being perpendicular to the first direction and the second direction;
   wherein the damping members are rotatably attached to the first cage, and each of the damping members further comprises an additional portion disposed outside of the first cage; the first cage comprises a plurality of plates each defining openings, the damping members being rotatably attached to the plates and extending into inside of the first cage via the openings.

8. The mounting apparatus as described in claim 7, wherein the damping members are attached to the plates via shafts which extends through the damping members to enter into holes defined in the plates, the shafts being rotatable in the respective holes in directions perpendicular to a moving direction of the second cage while the second cage entering into the first cage.

9. The mounting apparatus as described in claim 7, wherein the first cage comprises an entrance via which the second cage is capable of entering into the first cage, and a mounting flange formed at the entrance, the second cage comprising a positioning flange abutting the mounting flange of the first cage.

10. The mounting apparatus as described in claim 7, wherein the damping members are made of vibrations absorbing material.

* * * * *

UNITED STATES PATENT AND TRADEMARK OFFICE
CERTIFICATE OF CORRECTION

PATENT NO. : 7,656,655 B2 Page 1 of 1
APPLICATION NO. : 11/309240
DATED : February 2, 2010
INVENTOR(S) : Fan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 502 days.

Signed and Sealed this

Thirtieth Day of November, 2010

David J. Kappos
*Director of the United States Patent and Trademark Office*